(12) United States Patent
Cheng (10) Patent No.: US 10,790,825 B2
(45) Date of Patent: *Sep. 29, 2020

(54) MULTIPLE PROGRAMMABLE HARDWARE-BASED ON-CHIP PASSWORD

(71) Applicant: International Business Machines Corporation, Armonk, NY (US)

(72) Inventor: Kangguo Cheng, Schenectady, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/682,754

(22) Filed: Nov. 13, 2019

(65) Prior Publication Data

US 2020/0119734 A1    Apr. 16, 2020

Related U.S. Application Data

(63) Continuation of application No. 16/156,407, filed on Oct. 10, 2018, now Pat. No. 10,530,364.

(51) Int. Cl.
| | |
|---|---|
| H03K 19/00 | (2006.01) |
| H03K 19/177 | (2020.01) |
| H03K 19/1776 | (2020.01) |
| G06F 21/79 | (2013.01) |
| G06F 15/78 | (2006.01) |
| G06F 30/34 | (2020.01) |

(52) U.S. Cl.
CPC ..... *H03K 19/0013* (2013.01); *G06F 15/7842* (2013.01); *G06F 21/79* (2013.01); *G06F 30/34* (2020.01); *H03K 19/1776* (2013.01)

(58) Field of Classification Search
CPC ............ H03K 19/0013; H03K 19/1776; G06F 15/7842; G06F 21/79; G06F 17/5054
See application file for complete search history.

(56) References Cited

U.S. PATENT DOCUMENTS

| 5,587,665 A | 12/1996 | Jiang | |
|---|---|---|---|
| 2007/0045718 A1* | 3/2007 | Bhattacharyya | ....... B82Y 10/00 257/324 |
| 2009/0033355 A1 | 2/2009 | Hsu et al. | |
| 2016/0094229 A1* | 3/2016 | Tempel | ............ H03K 19/17708 326/38 |

FOREIGN PATENT DOCUMENTS

CN         1332522 C       5/2009

* cited by examiner

*Primary Examiner* — Daniel D Chang
(74) *Attorney, Agent, or Firm* — Yee & Associates, P.C.

(57) ABSTRACT

A method, system, and apparatus for setting an on-chip password is provided. In an embodiment, a method for programming an on-chip password includes determining a desired logic state for a field-effect transistor according to the on-chip password. The desired logic state is one of a first logic state and a second logic state. The method also includes subjecting one of a source and a drain of the field-effect transistor to hot-carrier stress according to the desired logic state to produce one of a symmetric state of the field-effect transistor and an asymmetric state of the field-effect transistor. The symmetric state corresponds to one of the first and second logic states. The asymmetric state corresponds to the other one of the first and second logic states.

16 Claims, 9 Drawing Sheets

MULTIPLE PROGRAMMABLE HARDWARE-BASED ON-CHIP PASSWORD

PRIORITY

This application claims priority to U.S. patent application Ser. No. 16/156,407 filed Oct. 10, 2018, and entitled "Multiple Programmable Hardware-Based-On-Chip Password."

BACKGROUND

The disclosure relates generally to semiconductor chips and more specifically to methods, systems, and structured for forming on-chip passwords.

On-chip password or chip identification has become increasingly important, particularly with the proliferation of Internet of things (IoT). The application of on-chip password can be used for access authentication and/or to prevent counterfeits. On-chip password can be software based or hardware-based. However, a software-based password is susceptible to cyberattack. A hardware-based password is typically achieved by using eFuse (electrical fuse) or by using embedded flash memory (eFlash). However, both methods have drawbacks. Although eFuse is typically CMOS compatible (for old CMOS nodes), one problem with eFuse is that it can only be used once. In other words, one cannot flexibly change the password. Thus, for the state-of-the-art CMOS, which use high-k/metal gates, the conventional eFuse can no longer be obtained without additional process steps. In contrast to eFuse, eFlash can be re-programmed multiple times. However, the eFlash process is not compatible with the conventional CMOS.

Therefore, it would be desirable to have a method and apparatus that take into account at least some of the issues discussed above, as well as other possible issues. For example, it would be desirable to have a method and apparatus that overcome a technical problem with forming an on-chip password that can be fabricated along with CMOS and that can be programmed multiple times.

SUMMARY

According to one embodiment of the present invention, a method for programming an on-chip password includes determining a desired logic state for a field-effect transistor according to the on-chip password. The desired logic state is one of a first logic state and a second logic state. The method also includes subjecting one of a source and a drain of the field-effect transistor to hot-carrier stress according to the desired logic state to produce one of a symmetric state of the field-effect transistor and an asymmetric state of the field-effect transistor. The symmetric state corresponds to one of the first and second logic states. The asymmetric state corresponds to the other one of the first and second logic states.

According to another embodiment of the present invention, a computer for programming an on-chip password includes a processor and a non-transitory computer readable storage medium storing program code which, when executed by the processor, performs a computer-implemented method of using the computer to program an on-chip password. The program code includes program code for determining a desired logic state for a field-effect transistor according to the on-chip password, the desired logic state being one of a first logic state and a second logic state. The program code also includes program code for subjecting one of a source and a drain of the field-effect transistor to hot-carrier stress according to the desired logic state to produce one of a symmetric state of the field-effect transistor and an asymmetric state of the field-effect transistor. The symmetric state corresponds to one of the first and second logic states. The asymmetric state corresponds to the other one of the first and second logic states.

According to another embodiment of the present invention, a semiconductor device for on-chip password programming includes a field-effect transistor. The device also includes a hot-carrier stress application unit coupled to the field-effect transistor and configured to subject one of a source and a drain of the field-effect transistor to hot-carrier stress according to the desired logic state to produce one of a symmetric state of the field-effect transistor and an asymmetric state of the field-effect transistor. The symmetric state corresponds to one of the first and second logic states. The asymmetric state corresponds to the other one of the first and second logic states.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, "a number of" when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments recognize and take into account one or more considerations. For example, the illustrative embodiments recognize and take into account that providing an on-chip password that is reprogrammable multiple times is difficult. The illustrative embodiments recognize and take into account that one solution can use hot-carrier stress to introduce defects into the source and/or drain of a MOSFET to alter the symmetry of the MOSFET, thereby storing a logic state that can be measured by measuring the forward (i.e., normal) and reverse currents across the drain and source. In order to turn a symmetric MOSFET into an asymmetric MOSFET, hot-carrier stress is applied to one of the source and the drain to introduce defects. In order to turn an asymmetric MOSFET into a symmetric MOSFET, hot-carrier stress is applied to the other of the source or the drain from that to which hot-carrier stress was previously applied in order to introduce defects into the other side, such that both the source and the drain side contain substantially the same amount of defects. In order to turn the symmetric MOSFET back into an asymmetric state, hot-carrier stress is applied again to the one of the source and the drain to introduce additional defects that cause the MOSFET to once again be in an asymmetric state. The repeated application of hot-carrier stress may be performed to repeatedly change the MOSFET from an asymmetric state to a symmetric state or from a symmetric state to an asymmetric state.

Thus, the illustrative embodiments provide a method, apparatus, system, and computer program product for repeatedly programming an on-chip password. Thus, in an exemplary embodiment, a method for programming an on-chip password, includes determining a desired logic state for a field-effect transistor according to the on-chip password, the desired logic state being one of a first logic state and a second logic state. Next, one of a source and a drain of the field-effect transistor is subjected to hot-carrier stress according to the desired logic state to produce one of a symmetric state of the field-effect transistor and an asymmetric state of the field-effect transistor. The symmetric state corresponds to one of the first and second logic states. The asymmetric state corresponds to the other one of the first and second logic states.

Disclosed herein are methods, systems, and structures for forming an on-chip array circuit that can be used as an on-chip password. The disclosed array can be fabricated along with CMOS and can be programmed multiple times. In an embodiment, each password bit is achieved by a standard MOS transistor. In an embodiment, programming of each bit is achieved by hot-carrier stress.

A fresh MOSFET is symmetric. This means that the source and drain are interchangeable. The channel current remains the same for a fixed gate bias and a fixed source/drain bias regardless of which source/drain terminal is used as a source and which source/drain terminal is used as a drain. However, when a MOSFET is subject to hot-carrier stress (HCS), defects, such as interface traps, are generated and localized on the drain side. As a result, a MOSFET, after the first application of HCS becomes asymmetric. The channel current depends on which terminal is used as the source and which terminal is used as the drain during measurement. In an embodiment, the channel current is measured twice. In the first measurement, the terminal assignment during measurement is the same as that during HCS. In other words, the source in the HCS remains the source during the first measurement and the drain during HCS remains the drain during the first measurement. In the second measurement, the source and drain terminals are swapped. Thus, in the second measurement, the source in the HCS becomes the drain in the second measurement and the drain in the HCS becomes the source in the second measurement. The channel current in the second measurement is lower than the first measurement due to the asymmetric distribution of the defects generated by the HCS.

To set up a password for the first time, if a bit is logic "1", the corresponding MOSFET is subjected to HCS. If a bit is logic "0", then the corresponding MOSFET is not subjected to HCS. With an array of MOSFETs, a series of "1"s and "0"s are generated.

To change the password, each bit is first measured. In an embodiment, if the bit needs to be changed from "0" to "1", the corresponding MOSFET is subjected to HCS. If the bit needs to be changed from "1" to "0", the MOSFET is subjected to HCS with the original source as the drain and the original drain as the source during the new HCS, so that substantially the same amount of defects (traps) is generated on the original source side as were in the original, produced on the original drain side. After the second HCS, both the source and the drain sides have defects such that the MOSFET becomes symmetric.

To read the code, each MOSFET is measured twice. During the second measurement, the source and drain are swapped. If the channel current is comparable between these two measurements, then that MOSFET is symmetric and this indicates a logic "0" state. If the channel current is different between these two measurements, then the MOSFET is asymmetric and indicates a logic "1" state.

The process described herein can be repeated by programming each MOSFET to symmetric or asymmetric as appropriate to achieve a new password change. This process described herein can be repeated as often as the password is changed.

Although described in terms of a logic "1" state represented by a MOSFET in an asymmetric state and a logic "0" state represented by a MOFET in a symmetric state, in other embodiments, the logic "1" state may be represented by a MOSFET in a symmetric state and the logic "0" be represented by a MOSFET in an asymmetric state.

Figure 1:
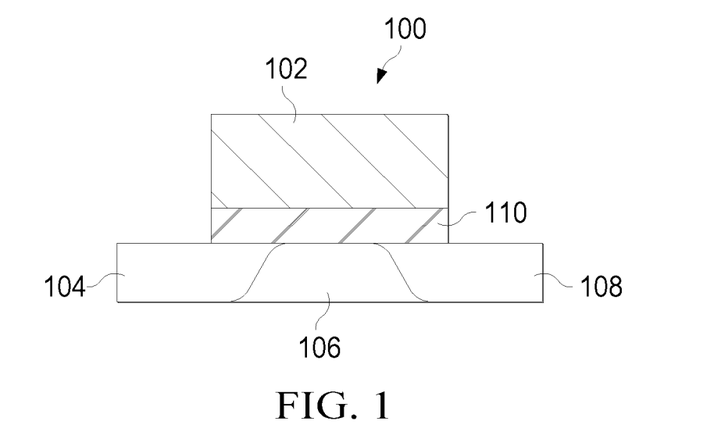
FIG. 1 is a diagram of a metal-oxide semiconductor field-effect transistor (MOSFET) before hot-carrier stress in accordance with an illustrative embodiment.

With reference now to the figures and, in particular, with reference to FIG. 1, a diagram of a metal-oxide semiconductor field-effect transistor (MOSFET) before hot-carrier stress is depicted in accordance with an illustrative embodiment. MOSFET 100 includes a gate 102, a source 104, a channel 106, a drain 108, and an insulator 110. The source 104 and drain 108 may be referred to as terminals and the terminals may be switched for purposes of measuring the drive current such that the drive current is measured not only in a normal mode (normal current measurement) from the source 102 to the drain 108, but also a drive current may be measured in a reverse mode (reverse current measurement) from the drain 108 to the source 104. Normal and reverse mode current measurements are explained in greater detail below.

Figure 2:
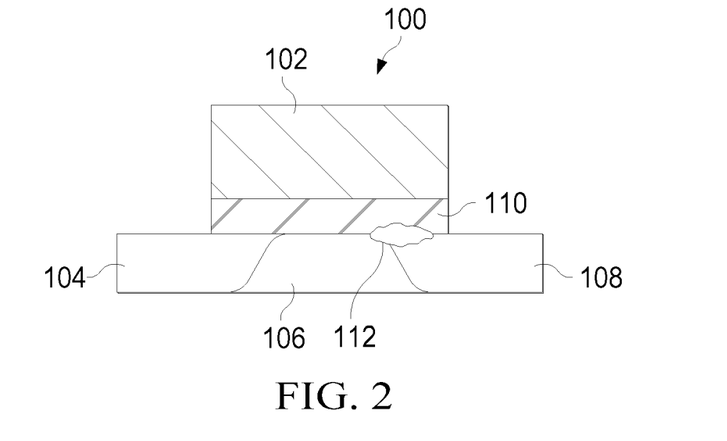
FIG. 2 is a diagram of MOSFET after hot-carrier stress applied to the drain in accordance with an illustrative embodiment.

FIG. 2 is a diagram of MOSFET 100 after hot-carrier stress applied to the drain 108 of the MOSFET 100 in accordance with an illustrative embodiment. For hot-carrier stress, in order to create defects on drain 108 side of a MOSFET 100, the following voltage condition is applied to the MOSFET 100. Source terminal 104 is grounded (0 volt), a high voltage is applied to the drain terminal 108, and a voltage greater than the threshold voltage of the MOSFET 100 is applied to the gate terminal 102 to turn on the MOSFET 100. For n-type MOSFET, high energy electrons flow from source through the channel 106 to drain 108. They are accelerated by the electrical field between source 104 and drain 108 and gain kinetic energy. When they arrive at drain 108 side, those high energy electrons (often referred to as "hot electrons") creates defects near the drain 108 region. Similarly, for p-type MOSFET, hot carriers are hot holes instead of hot electrons. Defects can be interfaces traps such as dangling bonds between the gate dielectric and the channel 106 of the MOSFET 100. Defects can also be hot carriers injected into the gate dielectric, or both. The effect of those defects is that they change of characteristics of the MOSFET 100. For example, before hot carrier stress a MOSFET 100 is typically symmetric (meaning source 104 and drain 108 terminals are structurally identical). After hot carrier stress, the MOSFET 100 becomes asymmetric due to localized defect generation (drain side or source side depending on bias condition). The stress voltages depend on the MOSFET dimensions such as gate length, gate dielectric thickness, etc. For example, for a MOSFET with a gate length of 25 nm, and an equivalent gate dielectric thickness of about 1.5 nanometers (nm), a gate voltage can be about 1 volt (V), and 2.5V can be applied to drain 108 while source is grounded (0V) to create defects on drain 108 side. Conversely, for the same MOSFET 100, defects can be generated on source 104 side by grounding drain 108 and applying 2.5V on source.

As shown, defects 112 are present between the gate 102, channel 106, and drain 108 of the MOSFET 100. The defects 112 are represented by "X"s in the Figures. In the depicted example, the defects 112 are on the drain 108 side of the MOSFET 100. However, in other embodiments, the hot-carrier stress could be applied to the source 104 side and, in that case, the defects 112 would be on the source 104 side of the MOSFET 100. If it is desired to create defects on the source 104 side, the drain 108 side is grounded, applying a high voltage on source side, and a gate voltage is greater than the threshold voltage of the MOSFET 100 to turn it on (basically flipping the source/drain terminals 104, 108). The defects 112 cause an asymmetry in the MOSFET 100 that is measurable. The current from the source 104 to the drain 108 is compared to the current from the drain 108 to the source 104. When there is an asymmetry in the MOSFET 100 due to the defects 112, the current from the source 104 to the drain 108 is different from that of the current from the drain 108 to the source 104. If there is no asymmetry in the MOSFET 100, then the difference in the current in the two directions will be zero. It should be noted that in an embodiment, the absolute value of the drive current in either direction (e.g., source to drain or drain to source) is not important. The bit information (logic "1" or "0") is determined by the current difference between the two measurements (in normal mode and in reverse mode). The bit information does not depend on the absolute value of the drive current. Alternatively, in an embodiment, instead of measuring the current, other device characteristics, such as, for example, threshold voltages, subthreshold slopes, transconductances, resistances are measured in normal mode and in reverse mode to determine the bit information (logic "1" or "0"). A measurement of a device characteristic in normal mode for each device characteristic is a mode in which MOSFET is biased in a normal fashion such that the source and drain operate as a source and drain respectively. A measurement of a device characteristic in a reverse mode is a measurement made in a mode in which the MOSFET is biased in a reverse fashion such that the source acts as a drain and the drain acts as a source.

Figure 3:
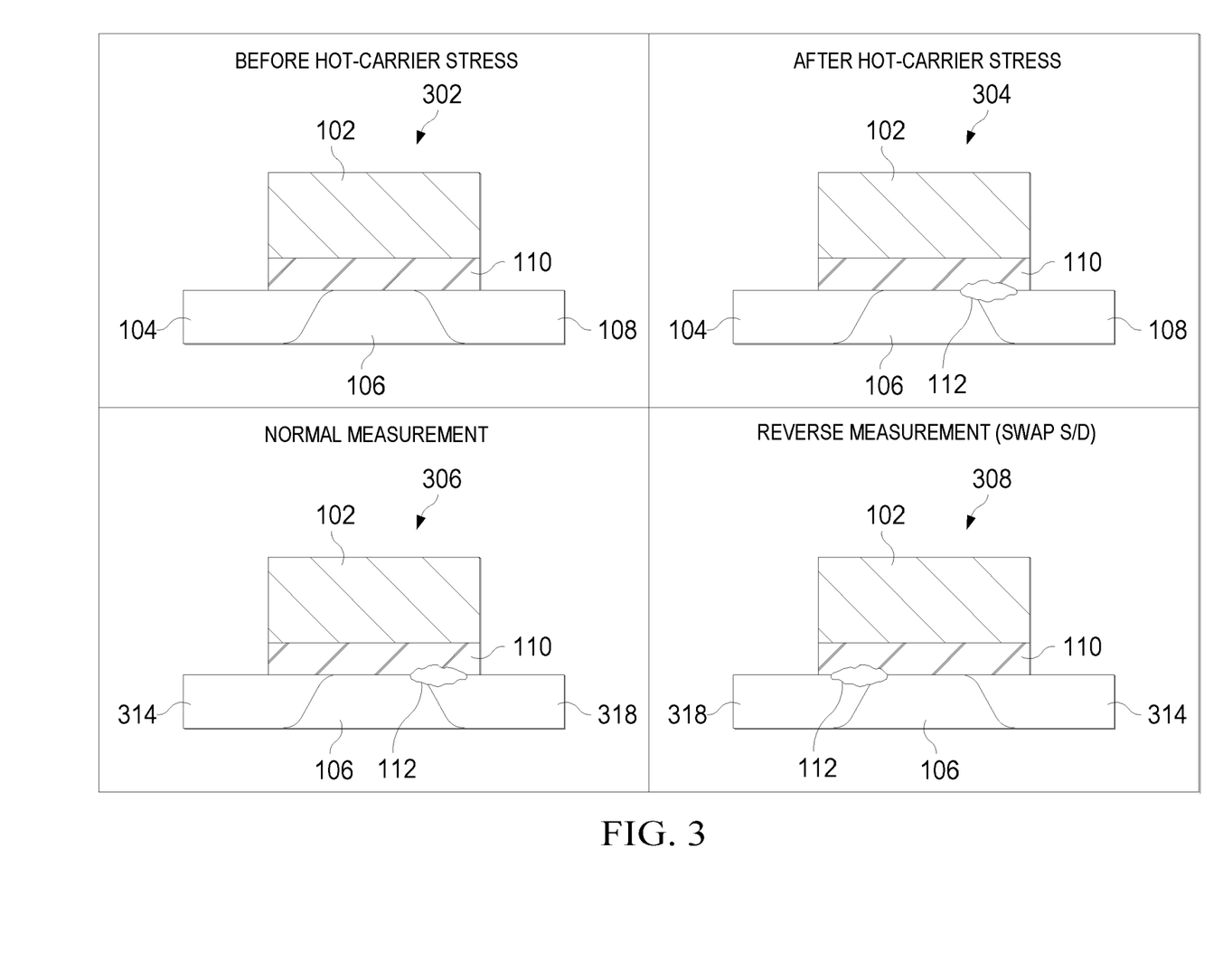
FIG. 3 is a diagram illustrating a MOSFET before and after hot-carrier stress in accordance with an illustrative embodiment.

FIG. 3 is a diagram illustrating a MOSFET before and after hot-carrier stress and with normal and reverse current measurements in accordance with an illustrative embodiment. MOSFET 302 is a MOSFET before application of hot-carrier stress. As shown, MOSFET 302 is symmetric without defects on either the source 104 or drain 108 sides. MOSFET 304 is a MOSFET after application of hot-carrier stress to the drain 108 side of the MOSFET 304 thereby introducing defects 112 on the drain 108 side of the MOSFET 304. MOSFET 306 represents a MOSFET under normal current measurement measured from the source 314 to the drain 318. MOSFET 308 represents a MOSFET under a reverse current measurement from the drain 318 to the source 314.

Figure 4:
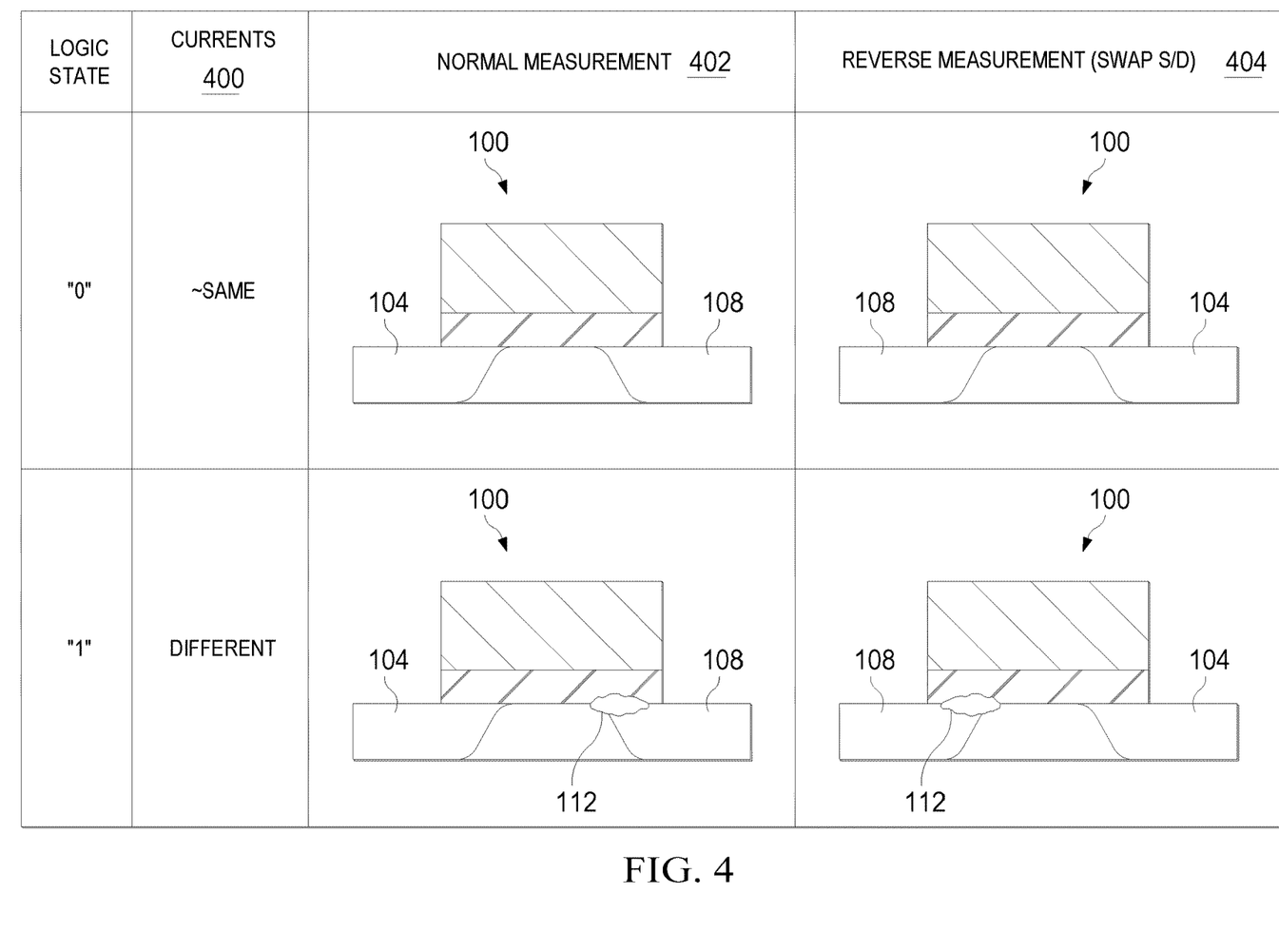
FIG. 4 is a diagram showing the logic state corresponding to various states of the MOSFET in accordance with an illustrative embodiment.

FIG. 4 is a diagram showing the logic state corresponding to various states of the MOSFET 100. In the logic state "0", the MOSFET 100 is symmetrical such that the normal measurement of the current 400 equaling normal current measurement 402 from the source 104 to the drain 108 is the same as the reverse current measurement 404 where the source 104 and drain 108 have been swapped such that the drain 108 is now the source and the source 104 is now the drain. In the logic state "1", the currents from the normal measurement 402 and from the reverse measurement 404 are different.

Figure 5:
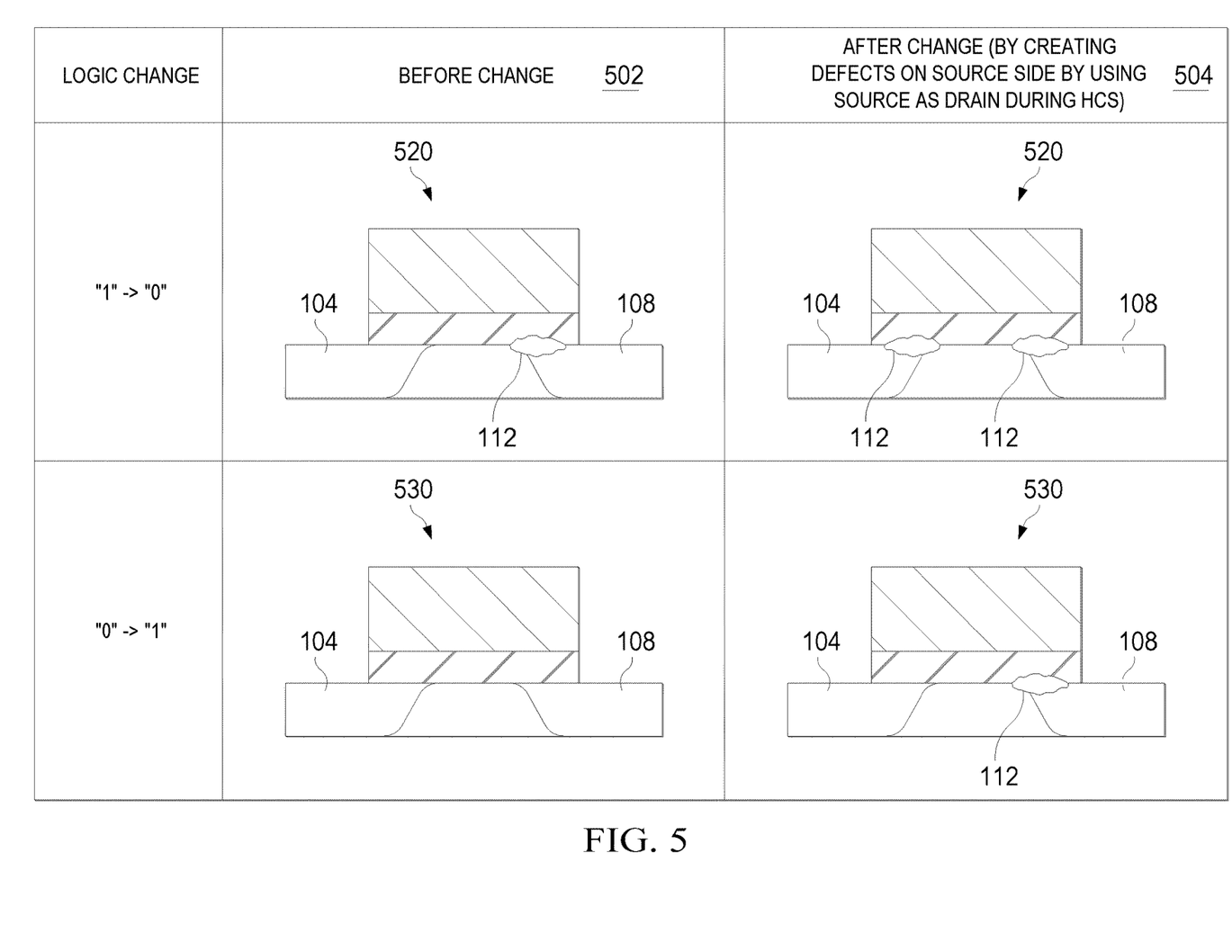
FIG. 5 is a diagram showing the state of a MOSFET before and after application of hot-carrier stress for changing the logic of the MOSFET in accordance with an illustrative embodiment.

FIG. 5 is a diagram showing the state of a MOSFET before and after application of hot-carrier stress for changing the logic of the MOSFET in accordance with an illustrative embodiment. In an embodiment, in order to change a MOSFET from a logic state "1" to a logic state "0", hot-carrier stress is applied to the one of the source 104, such that the MOSFET 520 can be returned to a symmetric state by having an equal amount of defects 112 on both the source 104 and the drain 108 side of the MOSFET 520. In the depicted example, hot-carrier stress is applied to the source 104 to create defects 112 on the source side of the MOSFET 520. The MOSFET 520 before the change 502 is shown on the upper left of the diagram and the MOSFET 520 after change 504 is shown on the upper right of the diagram. By creating defects on the source 104 side of the MOSFET 520, the MOSFET 520 is changed from an asymmetric state to a symmetric state, thereby changing the logic from "1" to "0".

In an embodiment, in order to change a MOSFET from a logic state "0" to a logic state "1", the MOSFET 530 is subjected to a hot-carrier stress on the drain 108 in order to create an asymmetry in the MOSFET 530 and thereby result in the MOSFET 530 changing from a logic "0" to a logic "1". In the depicted example, hot-carrier stress is applied to the drain 108 of the MOSFET 530 to cause the MOSFET to become asymmetric with respect to defects 112 and thereby change the MOSFET 530 from a logic "0" to a logic "1" state. The MOSFET 530 in logic state "0" before the change 502 is shown on the lower left of the Figure and the MOSFET 530 in logic state "1" after change 504 by creating defects on the drain 108 side of the MOSFET 530 is shown on the lower right of the Figure.

Figure 6:
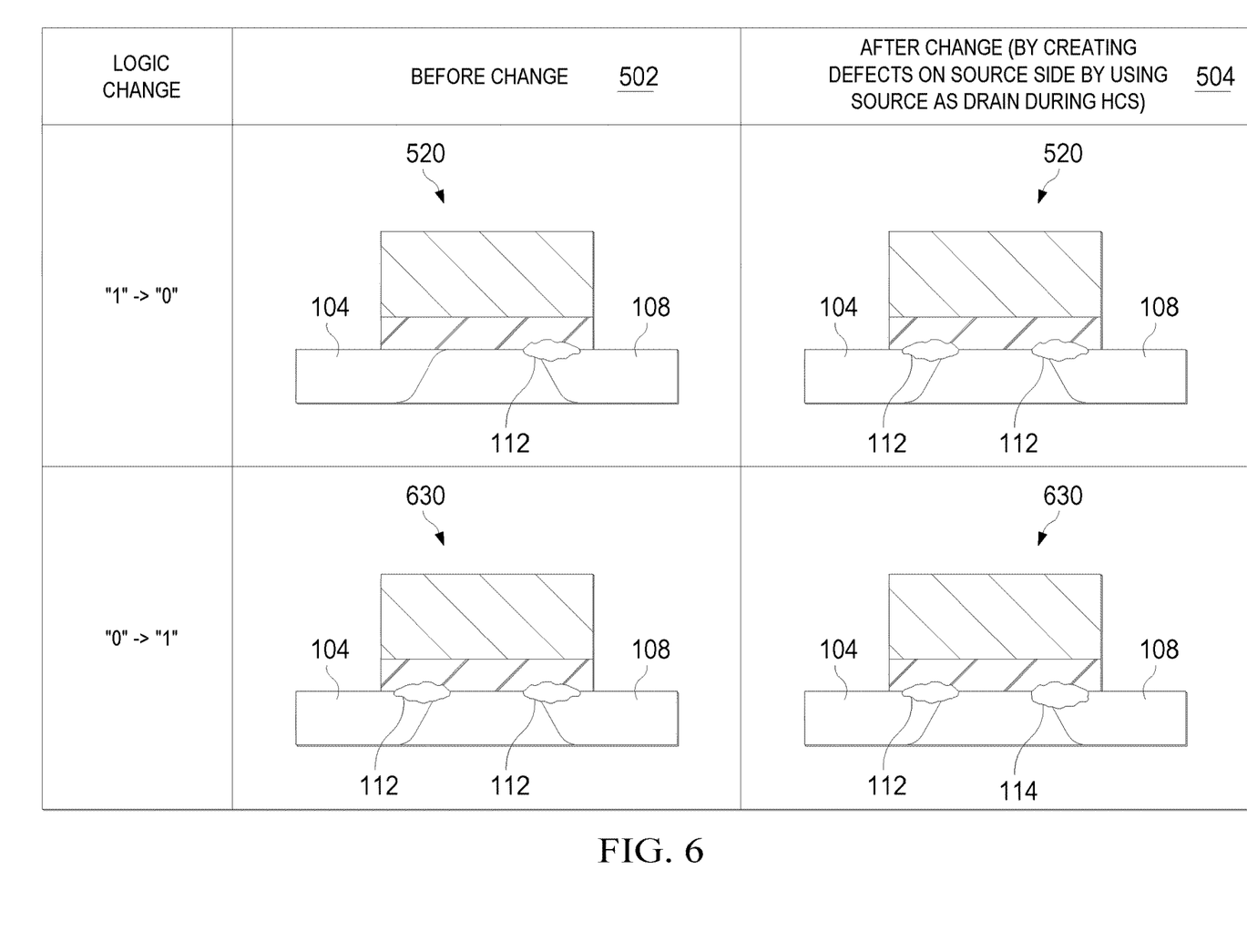
FIG. 6 is a diagram showing the state of a MOSFET before and after application of hot-carrier stress for changing the logic of the MOSFET in accordance with an illustrative embodiment.

FIG. 6 is a diagram showing the state of a MOSFET before and after application of hot-carrier stress for changing the logic of the MOSFET in accordance with an illustrative embodiment. The top part of FIG. 6 showing the procedure for changing a MOSFET 520 from a logic "1" to logic "0"

is the same as shown in FIG. 5. In the example, the MOSFET 630 has already been subjected to hot-carrier stress on both source 104 and drain 108, such that both the source 104 and the drain 108 contain defects 112. In order to change the MOSFET 630 from a logic state "0" to a logic state "1", the drain 108 is subjected to hot-carrier stress again in order to introduce additional defects 114 on the drain 108 side of the MOSFET 630, such that the MOSFET 630 is once again in an asymmetric state due to the presence of additional defects 114 on the drain side 108, than are present on the source 104 side. The MOSFET 630 before the change 502 is shown on the lower left of the Figure and the MOSFET 630 after the change 504 is shown on the lower right of the Figure.

Thus, the MOSFET 630 may be reprogrammed multiple times by applying additional hot-carrier stress to the appropriate one of the source 112 and the drain 108 in order to introduce additional defects 112, 114 as needed to make the MOSFET 630 either symmetric or asymmetric as needed to change the logic from "0" or "1" to "1" or "0".

Figure 7:
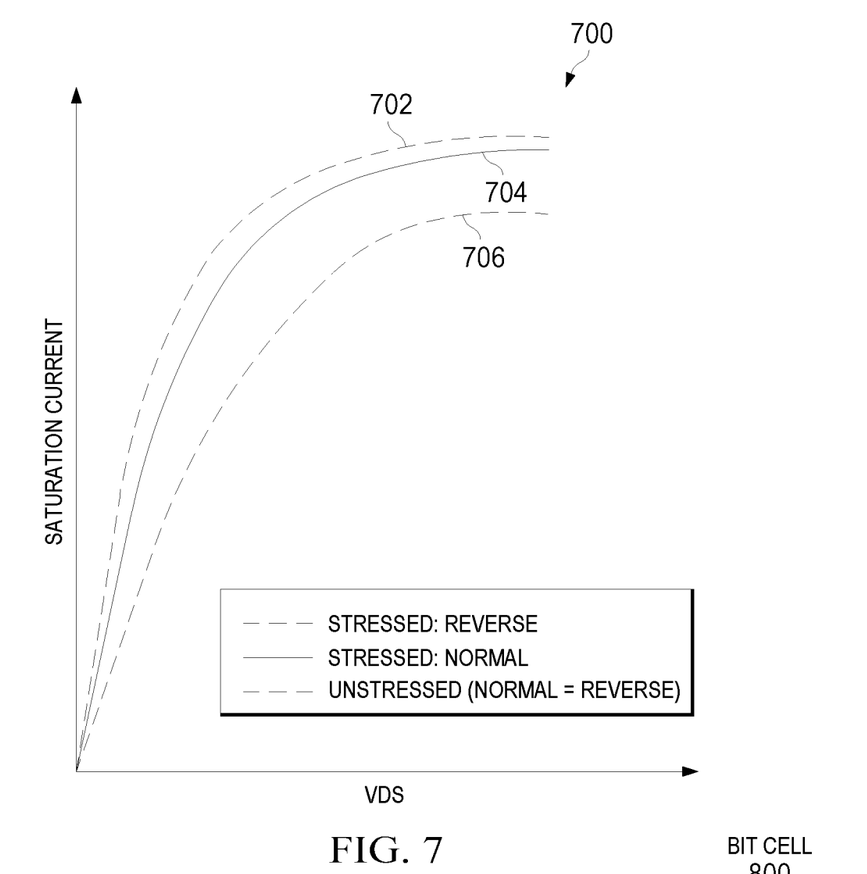
FIG. 7 is a diagram showing saturation current as a function of voltage ($V_{ds}$) between the drain and source for both unstressed and stressed MOSFETs in accordance with an illustrative embodiment.

FIG. 7 is a diagram 700 showing saturation current as a function of voltage ($V_{ds}$) between the drain and source for both unstressed and stressed MOSFETs. Graph 702 is a plot of the saturation current versus $V_{ds}$ for an unstressed MOSFET. An unstressed MOSFET is a MOSFET that has not been subjected to hot-carrier stress (or one that has been subjected to multiple hot-carrier stresses such that the amount of defects on the drain and the source are substantially the same). The saturation current for the unstressed MOSFET is the same for the normal current (i.e., current from source to drain) as for the reverse current (i.e., current from the drain to the source). Graph 704 shows the normal saturation current (i.e., current from the source to the drain) versus $V_{ds}$ for a stressed MOSFET (i.e., a MOSFET in which an asymmetry in defects on the source and drain of the MOSFET exists as a result of selectively applying hot-carrier stress to only one of the source and the drain or applied more to one of the source and the drain). Graph 706 shows the reverse current (i.e., current from the drain to the source) for a stressed MOSFET. As shown, the graph 704 of the saturation current for the stressed normal measurement of current for the MOSFET compared to the graph 706 of the saturation current for the stressed reverse measurement of the current for the MOSFET shows that the current is not the same for each Vds value. In an embodiment, this difference in current is measured and used to determine the logic state of the MOSFET. When the normal and reverse current are the same, the MOSFET is considered to be in a first logic state (e.g., a logic state "0") and when the normal and the reverse current are not the same, the MOSFET is considered to be in a second logic state (e.g., a logic state "1").

Figure 8:
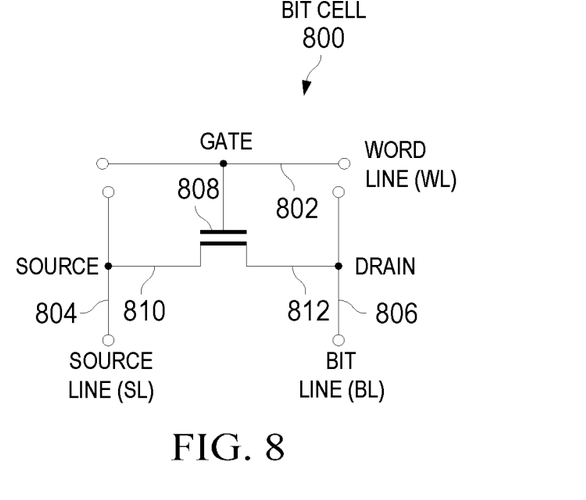
FIG. 8 is a diagram of a bit cell in accordance with an illustrative embodiment.

FIG. 8 is a diagram of a bit cell 800 in accordance with an illustrative embodiment. Bit cell 800 includes a word line (WL) 802, a source line (SL) 804, and a bit line (BL) 806. The bit cell 800 also includes a MOSFET that includes a gate 808 connected to the WL 802, a source 810 connected to the SL 804, and a drain 812 connected to the BL 806. The MOSFET including the gate 808, source 810, and drain 812 may be implemented as any of MOSFETs 100, 302, 304, 306, 308, 520, 530, 630. The MOSFET in bit cell 800 may be subjected to hot-carrier stress as appropriate to change a logic state of the MOSFET.

Figure 9:
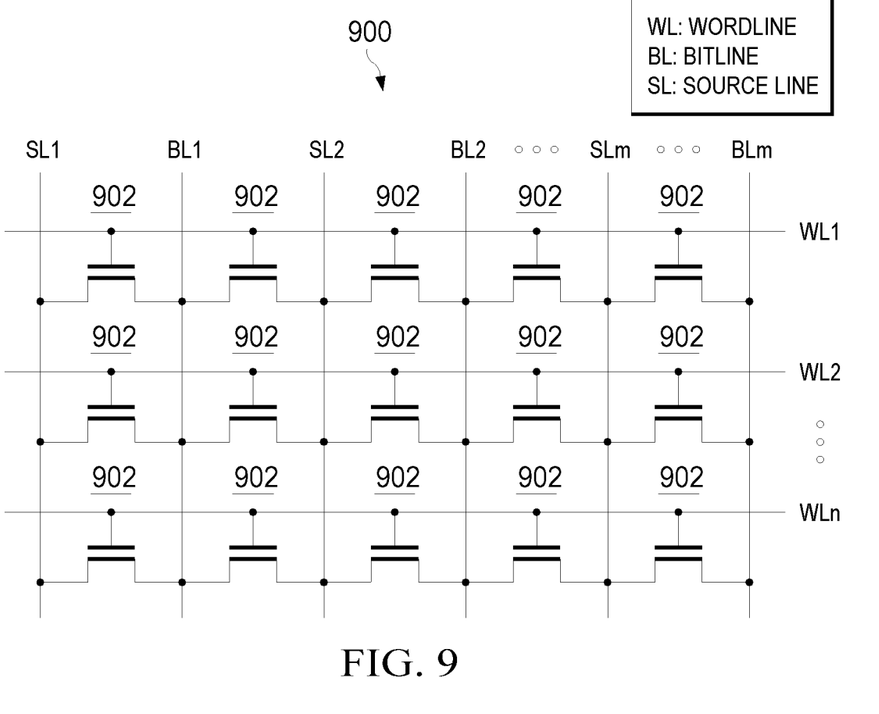
FIG. 9 is a diagram of an array of bit cells in accordance with an illustrative embodiment.

FIG. 9 is a diagram of an array 900 of bit cells 902. The Array 900 includes a plurality of bit cells 902, source lines SL1, SL2, . . . SLm, a plurality of bit lines BL1, BL2, . . . BLm, and word lines WL1, WL2, . . . WLn. Each bit cell 902 may be implemented as any of MOSFETs 100, 302, 304, 306, 308, 520, 530, 630. The MOSFET in each of bit cells 902 may be subjected to hot-carrier stress as appropriate to change a logic state of the MOSFET. Each MOSFET in the bit cells 902 is individually and independently programmable such that each bit cell 902 may be in a logic state "0" or "1" independent of the logic state of any other bit cell 902.

Figure 10:
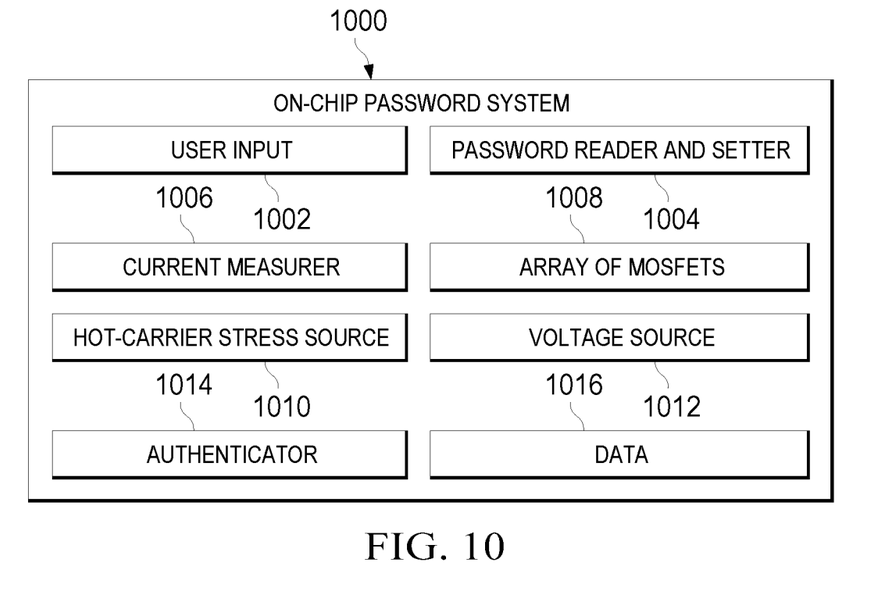
FIG. 10 is a diagram of an on-chip password system in accordance with an illustrative embodiment.

FIG. 10 is a diagram of an on-chip password system 1000 in accordance with an illustrative embodiment. On-chip password system 1000 includes a user input module 1002, a password reader and setter 1004, a current measurer 1006, an array of MOSFETs 1008, a hot-carrier stress source 1010, a voltage source 1012, an authenticator 1014, and data 1016. Data 1016 stores data. The user input module 1002 receives user password input data for setting or changing the password. The user input module 1002 also receives user input in the form of a password that, if correct, allows the user to access data 1016 protected by the on-chip password.

The password reader and setter 1004 reads and sets the password on the array of MOSFETs 1008. The current measurer 1006 measures the normal current and the reverse current across each of the array of MOSFETs 1008. Current across the MOSFETs 1008 may be driven by applying a voltage cross the source and drain of each MOSFET using the voltage source 1012.

The hot-carrier stress source 1010 applies hot-carrier stress to one of the drain or source of one of the MOSFETs 1008 in order to introduce defects into the source or drain side of one of the MOSFETs 1008. The defects, if introduced onto only one of the drain and source sides, cause the current measurement in the normal and reverse directions to be different. If defects are introduced into both the source and drain sides of one of the MOSFETs 1008, then the normal and reverse currents measured on that MOSFET 1008 will be the same. The logic state of each of the MOSFETs 1008 is determined by whether both the drain and source contain an equal amount of defects (or equal lack of defects) or whether one of the drain or source contains more defects than the other.

The password reader and setter 1004 works in conjunction with the current measurer 1006 to determine the logic state of each of the MOSFETs in the array of MOSFETs 1008. The sequence of logic states of the MOSFETs in the array of MOSFETs 1008 is the on-chip password. This on-chip password can be adjusted by the password reader and setter 1004. The password reader and setter 1004 also works in conjunction with the hot-carrier stress source in order to program the password into the array of MOSFETs 1008.

The authenticator 1014 receives a user input password from user input module 1002 and compares the user input to the password stored in the array of MOSFETs 1008. The password stored in the array of MOSFETs 1008 is read by password reader and setter 1004. If the password entered by the user matches the stored password, then the authenticator 1014 grants access by the user to the data 1016.

System 1000 may be implemented in software, hardware, firmware or a combination thereof. When software is used, the operations performed by [system 1000] may be implemented in program code configured to run on hardware, such as a processor unit. When firmware is used, the operations performed by [system 1000] may be implemented in program code and data and stored in persistent memory to run on a processor unit. When hardware is employed, the hardware may include circuits that operate to perform the operations in system 1000.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In an embodiment, system 1000 is a physical hardware system and includes one or more data processing systems. When more than one data processing system is present in system 1000, those data processing systems are in communication with each other using a communications medium. The communications medium may be a network. The data processing systems may be selected from at least one of a computer, a server computer, a tablet, or some other suitable data processing system.

The illustration of system 1000 in FIG. 10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 11:
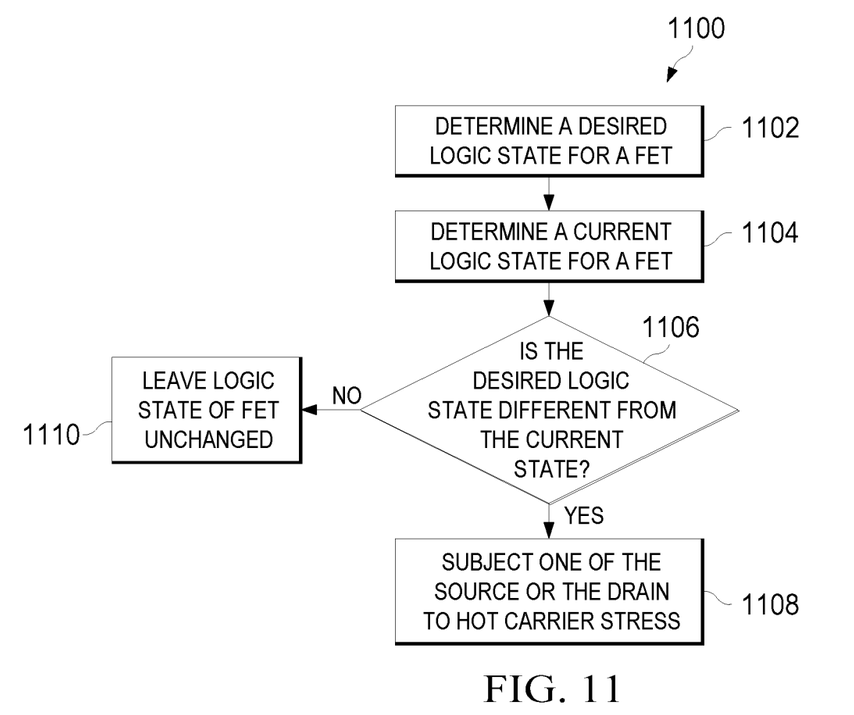
FIG. 11 is a flowchart of an exemplary method for setting an on-chip password in accordance with an illustrative embodiment.

FIG. 11 is a flowchart of an exemplary method 1100 for setting an on-chip password in accordance an illustrative embodiment. The processes in FIG. 11 can be implemented in hardware, software, or both. When implemented in software, the processes can take the form of program code that is run by one of more processor units located in one or more hardware devices in one or more computer systems. For example, these processes can be implemented in password reader and setter 1004 running on system 1000 in FIG. 10. Method 1100 begins by determining a desired logic state for a FET (step 1102). In an embodiment, the desired logic state is determined based on user input. Next, a current logic state for a FET is determined (step 1104). In an embodiment, the current logic state for the FET is determined by comparing the normal and reverse currents across the source and drain of the FET. If the normal and reverse currents are equal, then the logic state is a first logic state (e.g., logic state "0"). If the normal and reverse currents are not equal, then the logic state is a second logic state (e.g., logic state "1"). Next, the method 1100 determines if the desired logic state is different from the current logic state (step 1106). If the desired logic state is different from the current state, then one of the source or the drain is subjected to hot-carrier stress in order to introduce defects into the corresponding source or drain (step 1108). If the desired logic state of the FET is not different from the current state, then the logic state of the FET is left unchanged (step 1110).

Figure 12:
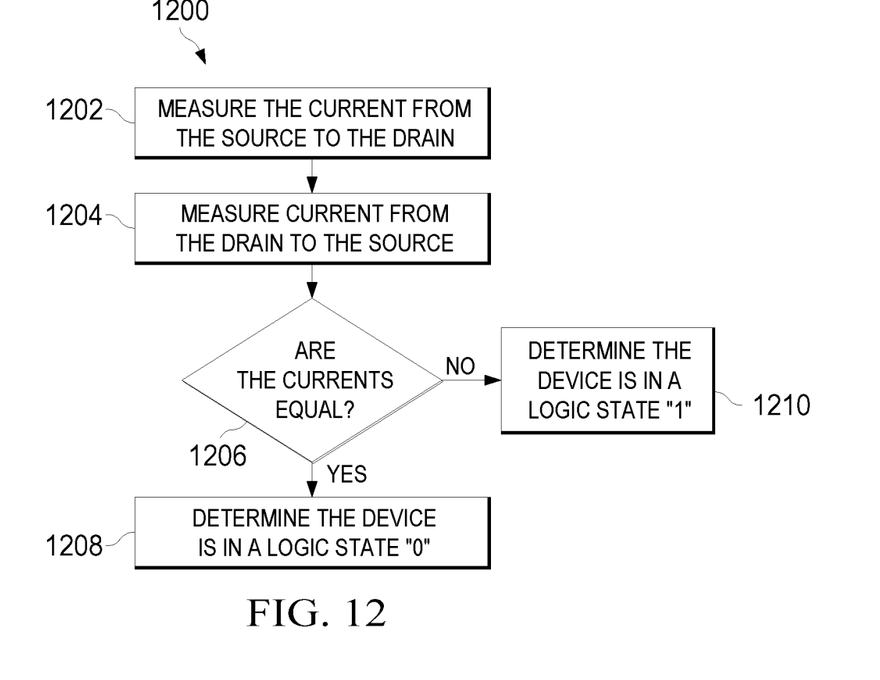
FIG. 12 is a flowchart of an exemplary method for reading the logic state of a FET in accordance with an illustrative embodiment.

FIG. 12 is a flowchart of an exemplary method 1200 for reading the logic state of a FET in accordance with an illustrative embodiment. The processes in FIG. 12 can be implemented in hardware, software, or both. When implemented in software, the processes can take the form of program code that is run by one of more processor units located in one or more hardware devices in one or more computer systems. For example, these processes can be implemented in password reader and setter 1004 running on system 1000 in FIG. 10. The method 1200 begins by measuring the current from the source to the drain (step 1202). Next, the current from the drain to the source is measured (step 1204). Next, the method 1200 determines if the normal current and the reverse current are equal (step 1206). If the two currents are equal, then the method 1200 determines that the device (e.g., MOSFET) is in a logic state "0" (step 1208). If the two currents are not equal, then the method 1200 determines that the device is in a logic state "1" (step 1210). In some embodiments, the determination of whether the normal current and the reverse current are the same is made by reference to a threshold. If the difference between the two currents exceeds a threshold, then the normal current and the reverse current are deemed different and if the difference between the two currents does not exceed the threshold, then the normal current and the reverse current are deemed to be the same.

In one illustrative example, one or more technical solutions are present that overcome a technical problem with repeatedly programming an on-chip password. As a result, one or more technical solutions may provide a technical effect of allowing an on-chip password to be programmed and re-programmed multiple times. In an embodiment, hot-carrier stress is used to change the symmetry of a MOSFET by introducing defects into one of the source and the drain. If the amount of defects (or lack thereof) are approximately the same on the source and the drain, the MOSFET is symmetric and the normal and reverse currents measured across the source and the drain are approximately equal. If the amount of defects on one of the source or the drain are more than on the other side, then the MOSFET is asymmetric and the normal and reverse currents measured across the source and the drain are different. This state of the MOSFET is persistent until reprogrammed. The state of the MOSFET may be reprogrammed multiple times.

Although described primarily with a symmetric state of the MOSFET representing a logic state "0" and an asymmetric state of the MOSFET as representing a logic state "1", in other embodiments, the symmetric state corresponds to a logic state "1" and the asymmetric state corresponds to the logic state "0".

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
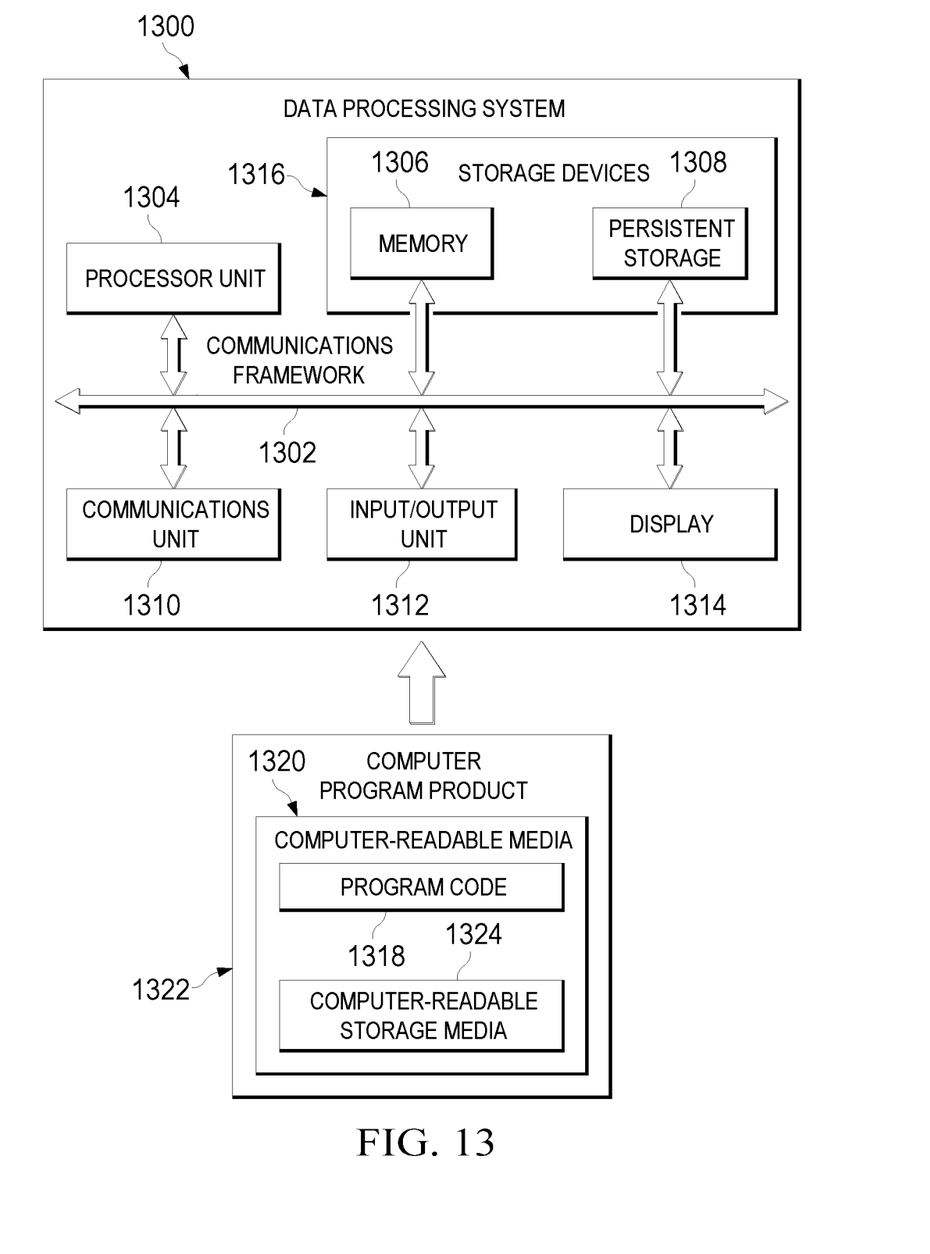
FIG. 13 is a block diagram of a data processing system in accordance with an illustrative embodiment.

Turning now to FIG. 13, a block diagram of a data processing system is depicted in accordance with an illustrative embodiment. In an embodiment, data processing system 1300 is implemented as on-chip password system 1000 depicted in FIG. 10. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, may be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a solid-state drive (SSD), a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer-readable program code that may be read and executed by a processor in processor unit 1304. The program code in the different embodiments may be embodied on different physical or computer-readable storage media, such as memory 1306 or persistent storage 1308.

A computer program product 1322 includes computer-readable media 1320. Program code 1318 is located in a functional form on computer-readable media 1320 that is selectively removable and may be loaded onto or transferred to data processing system 1300 for execution by processor unit 1304. Program code 1318 and computer-readable storage media 1324 form computer-readable media 1320 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318.

Alternatively, program code 1318 may be transferred to data processing system 1300 using a computer-readable signal media. The computer-readable signal media may be, for example, a propagated data signal containing program code 1318. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

Thus, illustrative embodiments of the present invention provide an on-chip multiple programmable password.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for programming an on-chip password, the method comprising:
   determining a desired logic state for a field-effect transistor according to the on-chip password, the desired logic state being one of a first logic state and a second logic state;
   subjecting one of a source and a drain of the field-effect transistor to hot-carrier stress according to the desired logic state to produce one of a symmetric state of the field-effect transistor and an asymmetric state of the field-effect transistor, the symmetric state corresponding to one of the first and second logic states, the asymmetric state corresponding to the other one of the first and second logic states; and reprogramming the on-chip password by subjecting a selected one of the source and the drain of the field-effect transistor to hot-carrier stress according to the current logic state and a new desired logic state, the selected one determined according to the current logic state.

2. The method of claim 1, wherein the subjecting one of the source and the drain to hot-carrier stress produces defects in the one of the source and the drain that are localized to the one of the source and the drain.

3. The method of claim 2, wherein the defects comprise interface traps.

4. The method of claim 1, further comprising reprogramming the on-chip password by:

measuring a first device characteristic in a normal mode;

measuring a second device characteristic in a reverse mode;

determining a difference between the first and second channel current;

determining a current logic state of the field-effect transistor according to the difference; and subjecting a selected one of the source and the drain of the field-effect transistor to hot-carrier stress according to the current logic state and a new desired logic state, the selected one determined according to the current logic state.

5. The method of claim 4, wherein the first device characteristic comprises one of a threshold voltage measured in a normal mode, a subthreshold slope measured in a normal mode, a transconductance measured in a normal mode, and a resistance measured in a normal mode and wherein the second device characteristic comprises one of a threshold voltage measured in a reverse mode, a subthreshold slope measured in a reverse mode, a transconductance measured in a reverse mode, and a resistance measured in a reverse mode.

6. The method of claim 1, further comprising an array of field-effect transistors.

7. The method of claim 1, wherein the field-effect transistor comprises a metal-oxide semiconductor field-effect transistor (MOSFET).

8. The method of claim 1, wherein the field-effect transistor comprises a complementary metal-oxide-semiconductor (CMOS).

9. A computer for programming an on-chip password, comprising:

a processor; and a non-transitory computer readable storage medium storing program code which, when executed by the processor, performs a computer-implemented method of using the computer to program an on-chip password, the program code comprising:

program code for determining a desired logic state for a field-effect transistor according to the on-chip password, the desired logic state being one of a first logic state and a second logic state;

program code for subjecting one of a source and a drain of the field-effect transistor to hot-carrier stress according to the desired logic state to produce one of a symmetric state of the field-effect transistor and an asymmetric state of the field-effect transistor, the symmetric state corresponding to one of the first and second logic states, the asymmetric state corresponding to the other one of the first and second logic states; and program code for reprogramming the on-chip password by subjecting a selected one of the source and the drain of the field-effect transistor to hot-carrier stress according to the current logic state and a new desired logic state, the selected one determined according to the current logic state.

10. The computer of claim 9, wherein the subjecting one of the source and the drain to hot-carrier stress produces defects in the one of the source and the drain that are localized to the one of the source and the drain.

11. The computer of claim 10, wherein the defects comprise interface traps.

12. The computer of claim 9, further comprising program code for reprogramming the on-chip password by:

measuring a first device characteristic in a normal mode;

measuring a second device characteristic in a reverse mode;

determining a difference between the first and second channel current;

determining a current logic state of the field-effect transistor according to the difference; and subjecting a selected one of the source and the drain of the field-effect transistor to hot-carrier stress according to the current logic state and a new desired logic state, the selected one determined according to the current logic state.

13. The computer of claim 12, wherein the first device characteristic comprises one of a threshold voltage measured in a normal mode, a subthreshold slope measured in a normal mode, a transconductance measured in a normal mode, and a resistance measured in a normal mode and wherein the second device characteristic comprises one of a threshold voltage measured in a reverse mode, a subthreshold slope measured in a reverse mode, a transconductance measured in a reverse mode, and a resistance measured in a reverse mode.

14. A semiconductor device for on-chip password programming, comprising:

a field-effect transistor; and a hot-carrier stress application unit coupled to the field-effect transistor and configured to determine a desired logic state for a field-effect transistor according to the on-chip password, the desired logic state being one of a first logic state and a second logic state; subject one of a source and a drain of the field-effect transistor to hot-carrier stress according to the desired logic state to produce one of a symmetric state of the field-effect transistor and an asymmetric state of the field-effect transistor, the symmetric state corresponding to one of the first and second logic states, the asymmetric state corresponding to the other one of the first and second logic states; and reprogram the on-chip password by subjecting a selected one of the source and the drain of the field-effect transistor to hot-carrier stress according to the current logic state and a new desired logic state, the selected one determined according to the current logic state.

15. The semiconductor device of claim 14, wherein the field-effect transistor comprises a complementary metal-oxide-semiconductor (CMOS).

16. The semiconductor device of claim 14, wherein a defect in the one of the source and the drain is produced when the one of the source and the drain is subjected to hot-carrier stress, wherein the defect is localized to the one of the source and the drain.

* * * * *